Sept. 21, 1965 D. R. BENNION ETAL 3,208,052

BIDIRECTIONAL SHIFT REGISTER UTILIZING FLUX PUMPING

Filed Feb. 20, 1961 5 Sheets-Sheet 1

INVENTORS.
DAVID R. BENNION
DOUGLAS C. ENGELBART

BY Lyon & Lyon

ATTORNEYS.

BIDIRECTIONAL SHIFT REGISTER UTILIZING FLUX PUMPING

Filed Feb. 20, 1961 5 Sheets-Sheet 2

INVENTORS.
DAVID R. BENNION
DOUGLAS C. ENGELBART
BY
Lyon & Lyon
ATTORNEYS.

INVENTORS.
DAVID R. BENNION
DOUGLAS C. ENGELBART
BY Lyon & Lyon
ATTORNEYS.

INVENTORS.
DAVID R. BENNION
DOUGLAS C. ENGELBART
BY Lyon & Lyon
ATTORNEYS.

BIDIRECTIONAL SHIFT REGISTER UTILIZING FLUX PUMPING

Filed Feb. 20, 1961 5 Sheets-Sheet 5

INVENTORS.
DAVID R. BENNION
DOUGLAS C. ENGELBART

BY Lyon & Lyon

ATTORNEYS.

United States Patent Office 3,208,052
Patented Sept. 21, 1965

3,208,052

BIDIRECTIONAL SHIFT REGISTER UTILIZING FLUX PUMPING

David R. Bennion, Menlo Park, and Douglas C. Engelbart, Palo Alto, Calif., assignors to AMP Incorporated, Harrisburg, Pa., a corporation of New Jersey Filed Feb. 20, 1961, Ser. No. 90,567
8 Claims. (Cl. 340—174)

This invention relates to magnetic-core shift registers and, more particularly, to improvements therein.

In articles by H. D. Crane, entitled "A High-Speed Logic System Using Magnetic Elements and Connecting Wire Only," found in the Proceedings of the I.R.E., volume 47, pages 63 through 73, January 1959, and also by H. D. Crane and D. R. Bennion, entitled "Design and Analysis of MAD Transfer Circuitry," Proceedings of the Western Joint Computer Conference, March 1959, there are described shift registers using multiaperture cores. These cores are toroidal in shape and, besides having a main toroidal aperture, may also have two other minor apertures in the material of the toroidal ring. One of these minor apertures is usually designated as an input aperture and the other as a transmit aperture. In an application for an Improved Shift Register, by David R. Bennion, filed November 25, 1959, and bearing Serial No. 855,335, now Pat. No. 3,125,747, and assigned to a common assignee, there is described how an improvement may be obtained in the operating tolerances of a shift register by employing an effect which has been caled "priming."

An object of this invention is to provide an improvement in shift registers of the type which employ the priming operation.

Yet another object of this invention is to provide an improved shift register wherein single-turn windings may be used throughout.

Still another object of this invention is the provision of an improved and novel shift register which employs priming, and which is bidirectional.

These and other objects of the invention may be effectuated by employing, in connection with a shift register of the type that employs priming, a source of driving current which will hereafter be called a pump drive source. This pump drive source applies a driving current to the same windings as are employed for priming the cores of the shift register but in a reverse direction. The amplitude of the applied pump drive current is only sufficient to reverse the flux in the legs of core material adjacent the output aperture of a core which has been primed. This causes a transfer of some flux into a succeeding core. The effect of inserting a pump operation between priming operations which are applied to a shift register is to compensate for losses which occur in the transfer of flux between cores. Thus, single turns may be used in the shift register, if desired. Furthermore, merely by the provision of an additional priming winding which is coupled to the cores through the one of the two minor apertures not already being used for priming, the shift register may be made bidirectional.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
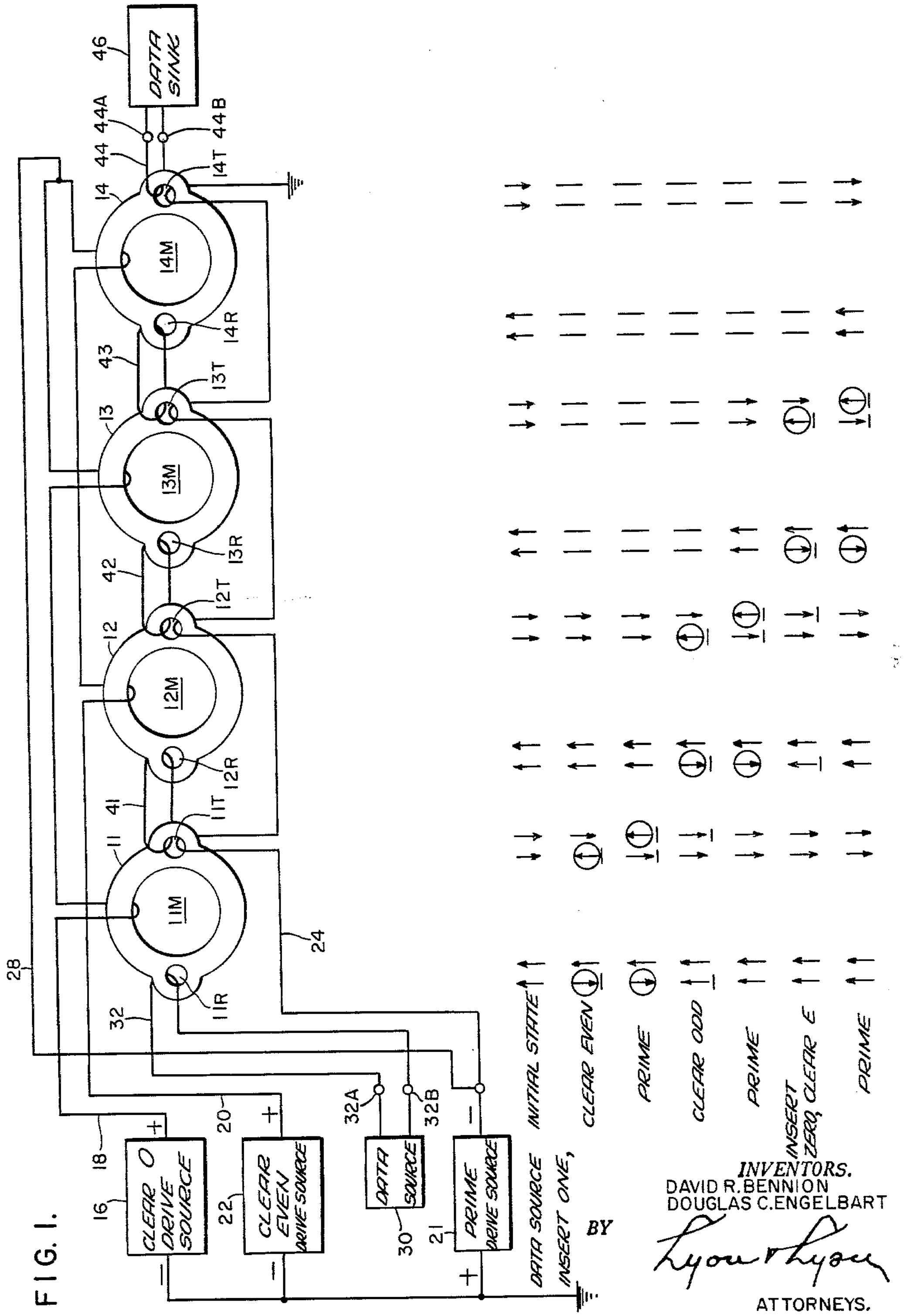
FIGURE 1 is a circuit diagram illustrating the use of priming in a shift register, which is shown in order to afford an understanding of this invention.

Reference is now made to FIGURE 1, which is a schematic circuit diagram of a shift register of a type which is described and claimed in the previously mentioned patent application by David R. Bennion, which is assigned to a common assignee. A brief description of this shift register will be provided since it is believed that it will afford both a better understanding, as well as an appreciation of this invention. Only four magnetic cores and their associated wiring are shown, both for this shift register, as well as for those to be described herein. This is by way of example, and is not to be construed as a limitation, since the principles of operation can be readily demonstrated with these few cores. Those skilled in the art will readily appreciate that these principles of operation may be applied to shift registers having many more cores, without departing from the spirit and scope of this invention.

The four cores shown in FIGURE 1, respectively 11, 12, 13, and 14, each have a main aperture 11M, 12M, 13M, and 14M, an input aperture 11R, 12R, 13R, and 14R, and an output aperture 11T, 12T, 13T and 14T. The odd cores 11 and 13 can be driven to their clear state of magnetic remanence by means including a clear-odd drive source 16, which is connected to a clear-odd drive winding 18 for applying a current thereto, when required. The clear-odd drive winding threads through the main apertures of the odd cores 11 and 13, and then joins an end of a clear-even drive winding 20, which is likewise threaded through the main apertures 12M, 14M of the even cores 12, 14, and receives a clear-drive current from a clear-even drive source 22. A priming winding 24 threads through all the output apertures 11T, 12T, 13T, and 14T of the cores in the shift register. The joined-together ends of the clear-even and clear-odd drive windings are connected by a connecting wire 28 to one end of the priming winding. Priming current is received from a priming drive source 26, which is connected to the priming winding. Priming current does not flow through the clear-odd and clear-even windings in view of the fact that the respective clear-odd and clear-even drive sources have high impedances. The clear drive currents, however, do flow through the connection 28 and the prime winding 24 to ground after first having passed through the clear-even or clear-odd winding, as the case may be. The prime winding serves to prime the cores when excited from the priming source, as will be described in more detail later herein. When one of the clear windings is excited, the prime winding serves to prevent spurious settings of a preceding core due to any voltages induced in a transfer winding by the clearing of a succeeding core.

A data source 30, exemplary of any suitable arrangement such as another magnetic core for applying a voltage to terminals 32A, 32B of input winding 32, introduces data in well-known fashion over the winding 32 into the core 11. The input winding 32 is coupled to core 11 through its input aperture 11R. The core 11 is coupled to the core 12 by means of a transfer winding 41, which couples the output aperture 11T of core 11 to the input aperture 12R of core 12. Similarly, transfer windings 42 and 43, respectively, couple cores 12 to 13 and 13 to 14 and are inductively coupled to these cores by passing through their respective output and input apertures. An output winding 44 is coupled to the output aperture of core 14. A data sink 46 is shown connected to output terminals 44A, 44B on output winding 44. The data sink represents any following structure, such as another magnetic core, which is adapted to receive the output from core 14 applied to the output winding 44.

Each one of the magnetic cores has two states of magnetic remanence; one of these will be referred to as the "clear" state and the other as the "set" state. The clear state will be associated with the storage of a binary zero in a core, and the set state will be associated with the storage of a binary one in a core. The assumed clear state is one wherein the flux in the core is deemed to circulate in a clockwise direction around the main aperture. The set state of a core is one wherein the half of the flux around the main aperture is in reverse to the remaining flux around the main aperture. The core material which is between a minor aperture and the main aperture is hereafter termed the inner leg, and the core material between the minor aperture and the outside periphery of a core is termed hereafter the outer leg. Thus, the core material between the output aperture 11T and the main aperture 11M is deemed the inner leg at the transmit aperture. The core material between the input aperture 11R and the outer periphery of the core 11 is deemed the outer leg at the input aperture. With the above assumptions and definitions in mind, attention is now directed to the table, which is shown associated with FIGURE 1 of the drawings, in order to facilitate an understanding of the operation of the shift register. Beneath each core in the shift register there is shown a column of arrows, which represent by their direction flux states in each leg of magnetic material of a core after the operation indicated at the left side of a row of arrows has occurred. A column of arrows indicates the successive states of the magnetic leg beneath which it is located. An arrow is underlined to indicate the location of a flux change during the drive interval. An arrow is circled to show where the flux is in other than its cleared state, and accordingly can indicate where the binary one is stored.

As may be seen from the table in FIGURE 1, initially all cores are in their clear states. The arrows underneath both legs adjacent the input apertures of the cores point upward and the arrows underneath both legs adjacent the output apertures of the cores point downward. Next, a drive current from the clear-even drive source 22 is applied to the clear-even winding 20 and also core 11 is driven to its set state by a current applied to the terminals 32A, 32B of input winding 32. The current is applied from the data source 30. This source may be a preceding core in a register, an external data source or indeed the output from core 14, if it is desired to have a circulating register. Cores 12, 13 and 14 are in their clear states. This is represented by the arrows beneath these cores, which indicate that the flux is circulating within these cores in a clockwise direction. The arrows underneath the input apertures representing the flux in the legs of material adjacent the input apertures 12R, 13R, 14R all point upward. The arrows underneath the output apertures 12T, 13T, 14T, which represent the state of the flux in the legs of material adjacent these output apertures all point downward. However, in core 11, which has been set, the arrow representing the flux in the outer leg adjacent the input aperture is reversed and points downward and the arrow representing the flux in the inner leg adjacent the output aperture is reversed and points upward. The circle around the arrows which are reversed from their condition when the core is in the clear state indicate that the flux was changed in core 11 when it was driven to its set state.

Next, a priming current is applied to all the cores from the source 21 by means of the prime winding 24. This results in reversing the flux around the output aperture 11T of core 11 as represented by the reversal of the direction of the arrows beneath that aperture in the "prime" row. The prime drive has no effect on any of the other cores.

The clear-odd drive source 16 is next excited. This drive source applies a current to the drive line 18, which in turn applies a drive to the clear state to the odd cores, here shown as cores 11 and 13. Core 11 is returned to its clear state as shown by the direction of the arrows beneath that core. The flux in the outer leg of material adjacent output aperture 11T induces a voltage in the transfer winding 41, which causes a current to flow therein, which in turn drives core 12 to the set state as represented by the arrows thereunder. Changes in direction of flux according to these arrows has occurred in the outer leg of material adjacent aperture 12R and in the inner leg of material adjacent aperture 12T.

A prime drive is next applied to the winding 24 from the priming drive source 26. This prime drive tends to reverse the flux about the output aperture of a core in which flux has been reversed from the state indicated when the core is in the clear state as is now the case with core 12. Therefore, the flux in the magnetic material adjacent the output aperture 12T is reversed from the state which it attained in response to the clear-odded drive.

Next, the clear-even drive source is operated to apply a current to the clear-even drive winding 20. This attempts to drive the even-numbered cores to their clear states. In response thereto, core 12 is driven to its clear state, and in so doing induces a current in the winding 42 coupled to the core 13. Core 13 is thus transferred from its clear to its set state, with the flux therein circulating in the manner represented by the arrows beneath the core 13 which are on the "clear-even" row.

At this time core 11 may be driven again, if required, to its "one" state from the data source 30, or left in its zero state. For simplifying this explanation, at this time core 11 is left in its zero state. A priming drive is again applied to all the cores. This time the flux around the output aperture of core 13 is reversed while the flux around the output apertures of the other cores which have not been driven to their set states is left unaffected. As a result of the priming drive, core 13 is now in the condition where a clear-odd drive current will transfer it to the clear state, and the core 14 will be driven to the set state.

The operation of the shift register shown in FIGURE 1 should be clear from the above description. The clear-odd drive results in clearing the odd cores and in transferring flux from those cores which are in their set states and had been primed, to the following cores. All the cores of the shift register have a priming drive applied to them, but only those cores which are in their set states are affected thereby. The clear-even drive is then applied to transfer those cores which were primed back to their clear state, with the result that the succeeding cores are driven to their set states. As previously indicated, the purpose for the connection 28 between one end of the clear drive windings and the prime winding is to excite the prime winding when one of the clear windings is excited to prevent any backward transfer of information over the transfer windings in response to a clear drive. Current flows through the prime winding at this time and effectively holds the core material against any backward effects of the clear drive. A detailed description of the priming operation is set forth in the previously mentioned application for David R. Bennion. The present explanation is presented to assist in an understanding of this invention.

Figure 2:
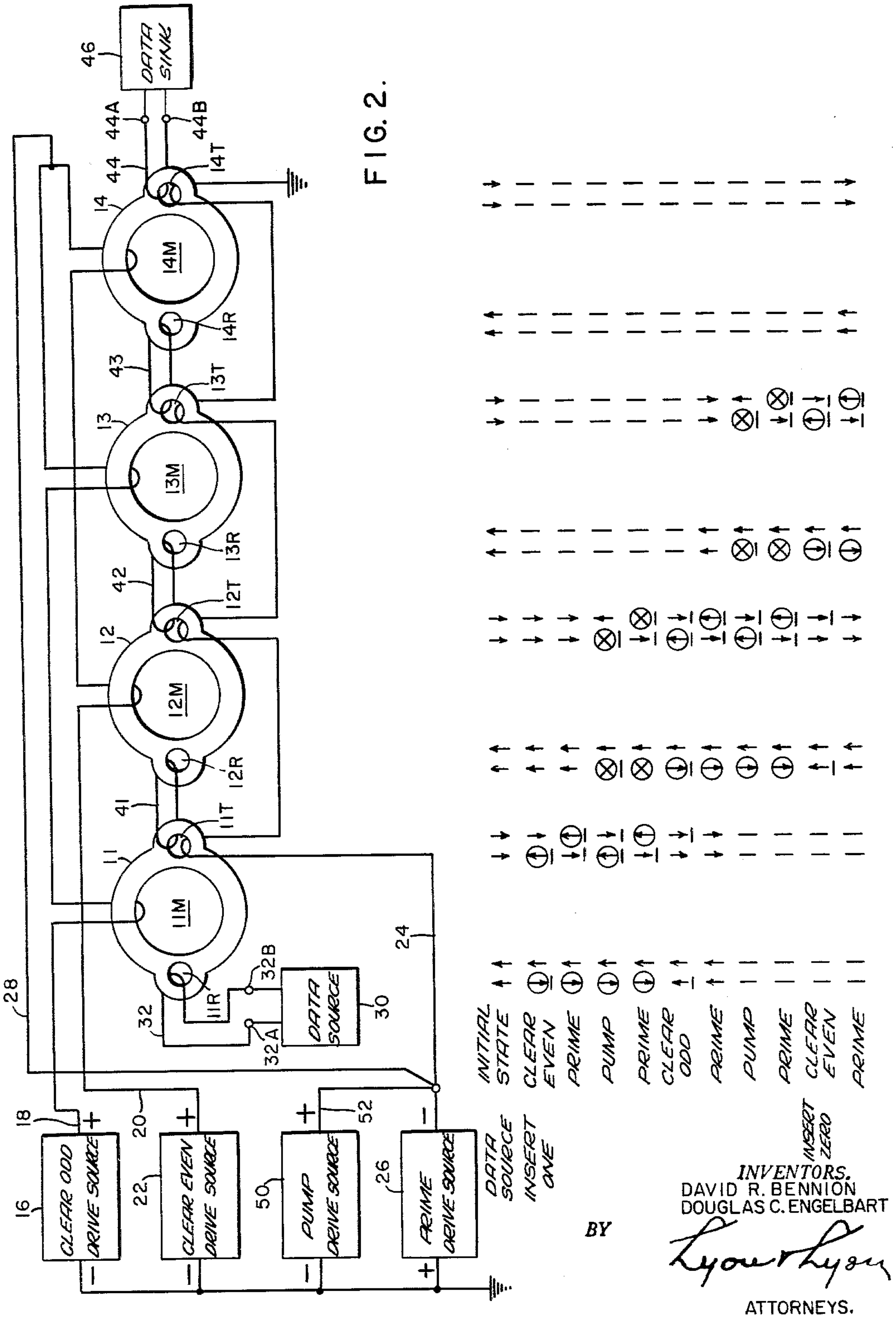
FIGURE 2 is a circuit diagram of an embodiment of the invention.

FIGURE 2 is a circuit diagram of an embodiment of the invention. The apparatus in FIGURE 2 which functions similarly to the apparatus shown in FIGURE 1 will bear the same reference numerals. The difference between the circuit diagram of FIGURE 1 and FIGURE 2 is the addition of another source of driving current, designated as a pump-drive source 50, which is connected over a conductor 52 to the prime drive winding 24. In FIGURE 2, beneath the circuit diagram, are shown the columns of arrows which represent the state of the flux in the legs of magnetic material adjacent the input and output apertures of the cores 11, 12, 13, and 14. In the listing of the flux states, the symbol "X" will indicate that the magnetic leg is approximately half-switched or approximately demagnetized on the average.

The operation of the apparatus, represented in FIGURE 2, initially is the same as described for FIGURE 1. First the initial states of all the cores are represented, then the states achieved by a clear-even drive as well as the drive of core 11 to its "one" state are represented. Thereafter, a representation is provided of the results of a priming drive which is applied to all the cores with the result that core 11 is primed.

The next current pulse applied to the shift register after the core 11 is primed is a pump pulse. The current from the pump-drive source, which is applied to the prime drive winding 24, is in a reverse direction to that from the prime-winding source, and therefore its effect is to reverse the flux in the legs of material adjacent the output aperture of core 11. In response to the pump drive, core 11 is not cleared or driven to its clear state, but some flux is transferred from core 11 to core 12 over the transfer winding 41. Assuming approximately 50 percent losses in the coupling between the cores and in the core loop, the outer leg next to the input aperture 12R and the inner leg adjacent the output aperture 12T are half-reversed, as is represented by the X's on the row of arrows adjacent the word "pump."

Following the pump drive, a priming drive is applied which restores the direction of the flux about the inner and outer legs of material adjacent the output aperture 11T to their prime state. The priming drive can now also affect the flux in the inner and outer legs of material adjacent the output aperture 12T, in view of the state of the flux in these legs as a result of the pump drive. This state of the flux may be considered as the "prime-after-pump" state, or partial-prime state, in which the flux in the inner leg adjacent aperture 12T is in the direction it assumes after priming and the flux in the outer leg is approximately half-reversed, as indicated by the X.

The next drive applied is a drive from the clear-odd drive source 16, which clears cores 11 and, again assuming 50 percent losses in the coupling between core 11 and core 12, finishes setting core 12. Thereafter, a prime-current drive is applied to all cores in the shift register, which results in core 12 being transferred to its prime state.

In the cycle of operation just described, flux was transferred from the core 11 to core 12 with unity gain, although 50 percent losses were assumed in the coupling between the cores. Looking at this another way, a gain factor of two-to-one before subtraction of coupling-loop loss is obtained by the employment of an additional drive source, and this gain is obtained despite the fact that the coupling loop has only a unity-turns ratio. The remaining drive intervals follow the sequence just described (with the exception that the clear-even drive current replaces the clear-odd drive in the second half of the cycle). Thus, the cycle of operation to the shift register would be one wherein, after the entry of data and the priming of the first core in the sequence of shift-register cores, there would follow a pump drive, prime drive, clear-odd core drive, prime drive, pump drive, prime drive, clear-even drive, prime drive, pump drive, etc. Direct-current priming may be employed, instead of pulse priming. With direct-current priming, the pulse clock sequence will simply be pump drive, clear-odd core drive, pump drive, clear-even core drive, with a sufficient interval between each drive to allow the direct-current priming to function. Arbitrarily higher gain factors may be achieved by additional repetitions of "pump" followed by prime previous to the clear pulse. However, this requires a separation between the pump and prime windings to prevent flux from being pumped out of the receiving core, as well as the transmitting core, in cycles of operation after the first. Thus, for an operation of this type, a prime winding is provided, as before.

The columns of arrows shown below the circuit in FIGURE 2 indicate the flux states assumed in response to the sequence of operation outlined at the left side of the table. The arrows show a complete cycle of drive with a transfer of data from core 11 to core 13. It will be appreciated that any number of cores can follow core 13, but the sequence of drives will be as indicated. Thus, the showing of the sequence for the transfer from only core 11 through core 13 should not be taken as a limitation upon the invention, but merely exemplary thereof. Further, circuitry for sequencing the operation of the drive current source, as indicated, is well known in the art, and thus will not be shown here.

Figure 3:
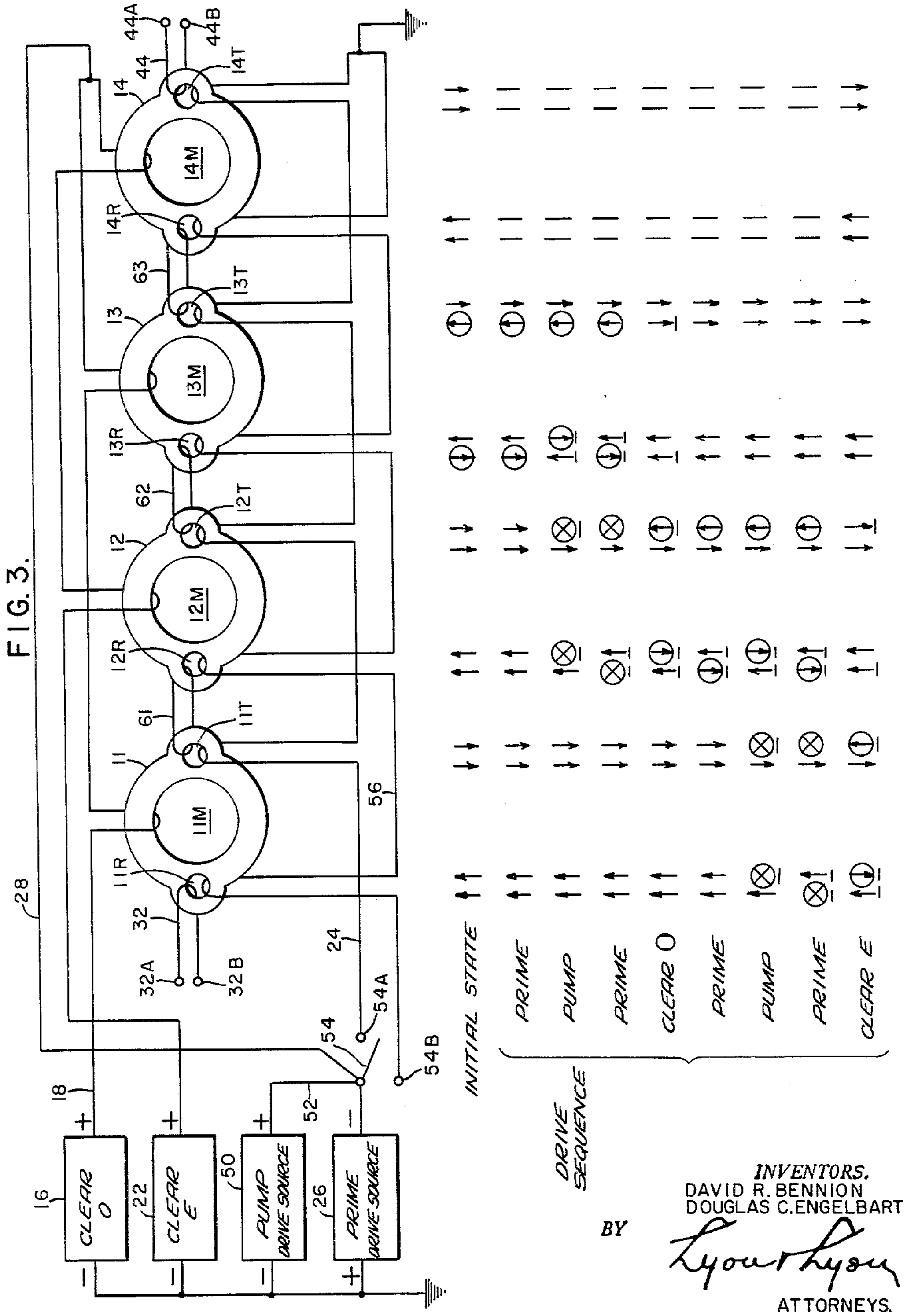
FIGURE 3 is a circuit diagram of an embodiment of the invention, illustrating how it can be made bidirectional.

FIGURE 3 is a circuit diagram of an embodiment of the invention which shows how the arrangement of FIGURE 2 may be modified to be symmetrical and to provide bidirectional shifting. Also shown in FIGURE 3 beneath the output and input apertures of the respective cores are the columns of arrows representing the states of flux in the various inner and outer legs of material surrounding these apertures which are achieved by the application of the drive designated adjacent a row of arrows when a reverse operation of the register is performed. The structure shown in FIGURE 3 is substantially identical with that shown in FIGURE 2, with the exception that there is added a switch 54 which has a terminal 54A connected to the prime winding 24, and a terminal 54B which is connected to an additional prime winding 56. The additional prime winding 56 is coupled to all the cores through their input apertures. The pump and prime drive sources, respectively 50, 26, are connected to the selecting arm of the switch 54. For advancing data through the shift register from left to right, the switch 54 is connected to the terminal 54A. The operation of the shift register is then exactly as has been described in connection with the description of FIGURE 2 of the drawings. Therefore, the operation of the shift register with switch 54 connected to terminal 54A need not be repeated here.

Assume now it is desired to operate the shift register in the reverse direction. Then the switch 54 is operated to make connection to terminal 54B, which makes the apertures formerly called input apertures operate as output apertures in actuality, and vice-versa. Assume now an initial state in which the core 13 has been placed in its set condition. This may have been achieved, for example, by a transfer from cores 11 through 12 to 13. Cores 11, 12, and 14 are in their clear state. The first step in the reverse drive sequence of the cores is that the priming-drive source 26 applies a priming current to the winding 56. The priming drive, which is applied to the material surrounding the aperture 13R, at this time does not cause any reversal in the flux state thereof since the material is already in the state to which it is being driven by the priming drive.

Following the priming drive, pump-drive current is applied to the prime winding 56 in a direction opposite to the priming current. This current flows through the priming winding 54B, causing a flux reversal in the legs of material about aperture 13R, with the result that current is induced in the transfer winding 62, whereby the magnetic material in the outer leg adjacent aperture 12T and the inner leg adjacent aperture 12R are driven part way toward saturation in their opposite magnetic states.

The next drive applied is a priming drive to the winding 56, whereby the magnetic core 13 is fully restored to its primed state, and the magnetic core 12 is what may be termed as partially primed wherein the flux conditions about the aperture 12R are reversed so that the magnetic material in the outer leg is substantially demagnetized while the magnetic material in the inner leg is saturated in what may be termed the clockwise direction.

The next drive pulse is a clear-odd drive which restores magnetic core 13 to its clear state and effectively causes a transfer of enough flux to core 12 to transfer it to the set state. It should be noted that for the set state attained by a core being driven in a reverse direction, the flux in the core is completely reversed from what it is for the set state of a core being driven in a forward direction; however, this has no effect on the basic operation of the circuit. The next prime-drive operation causes a reversal in the flux within the legs of material about the aperture 12R. The pump-source operation causes a transfer of flux from the core 12 to the core 11, with the result that the outer leg of material adjacent the aperture 11T and the inner leg of material adjacent the aperture 11R are partially demagnetized.

The following priming drive to all the cores of the shift register causes the material about the input aperture of core 12, now acting as an output aperture, to be fully primed again while the material about the input aperture of core 11 achieves the pump-after-prime state. The next drive is one from the clear-even drive source, which results in clearing core 12 and driving core 11 to its set state.

The arrangements just described may be operated using single turns throughout the entire shift register, but is not to be limited thereto. Drive windings may be scaled up in turns in order to reduce the drive current required. Unity-turns-ratio coupling loops other than single-turn loops may be used.

Although the embodiment of the invention shown in FIGURE 2 has been shown using a minor aperture as an input aperture, this should not be construed as a limitation upon the invention, since the major aperture of the cores in the shift register may also be used as an input aperture, if desired, with substantially the same results. Any of the winding arrangements shown in the previously mentioned application by David R. Bennion, Serial No. 855,335, may be employed with an additional pump drive source connected to the prime winding, as taught by this invention. As a matter of fact, a greater range may be obtained by having the common prime and pump winding link both major and minor apertures in the manner taught in the aforesaid application, since this provides more drive around the minor or output aperture without spurious switching around the major aperture. Where a bias winding through the major aperture, in addition to a priming winding, is provided to assist in the priming operation, the clear-drive current should be excluded from the bias winding, or else canceling windings should be added in the clear lines, such that total clear drive applied to the set of cores not being cleared is zero.

Figure 4:
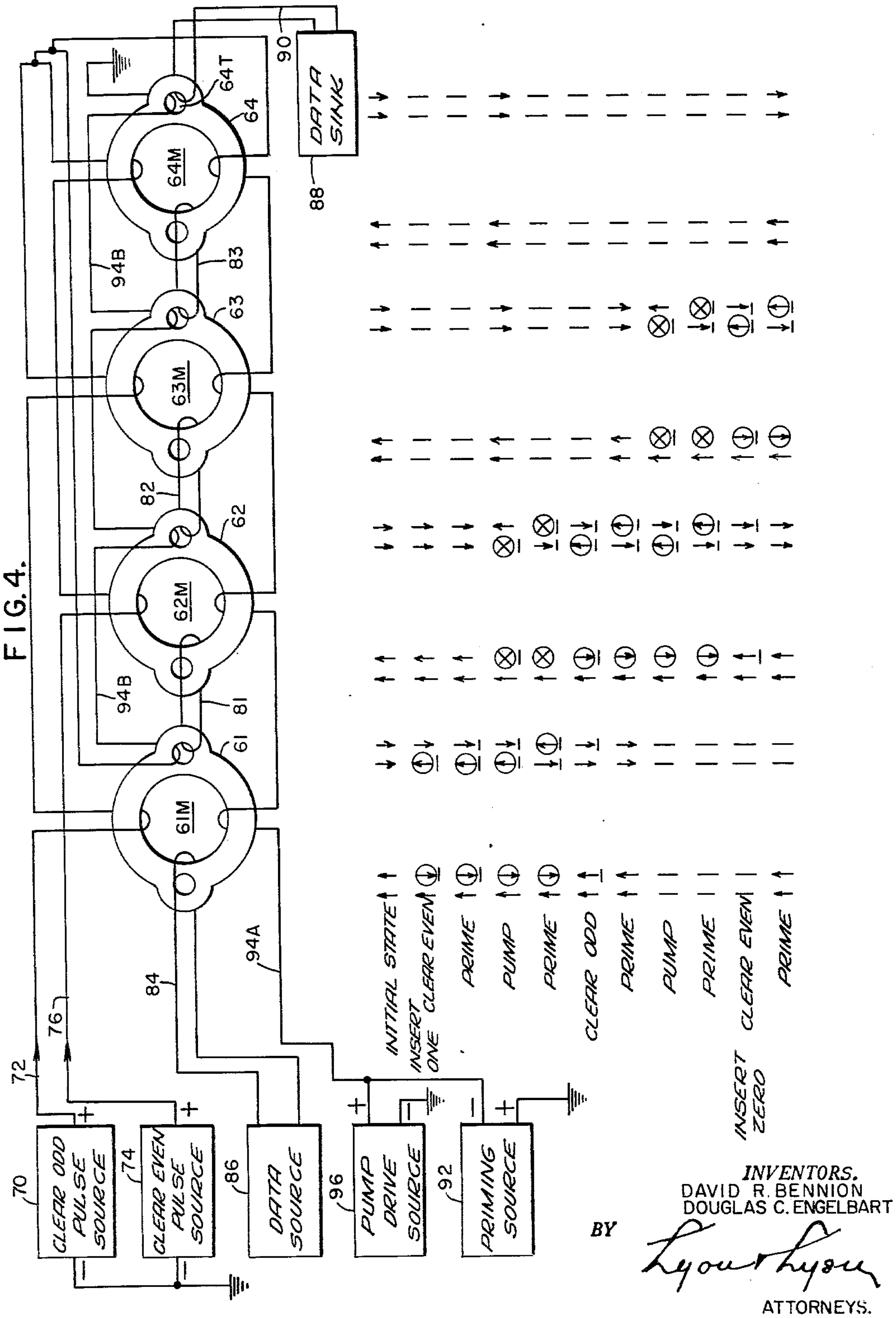
FIGURE 4 is a circuit diagram of another embodiment of the invention.
Figures 5, 6, 7:
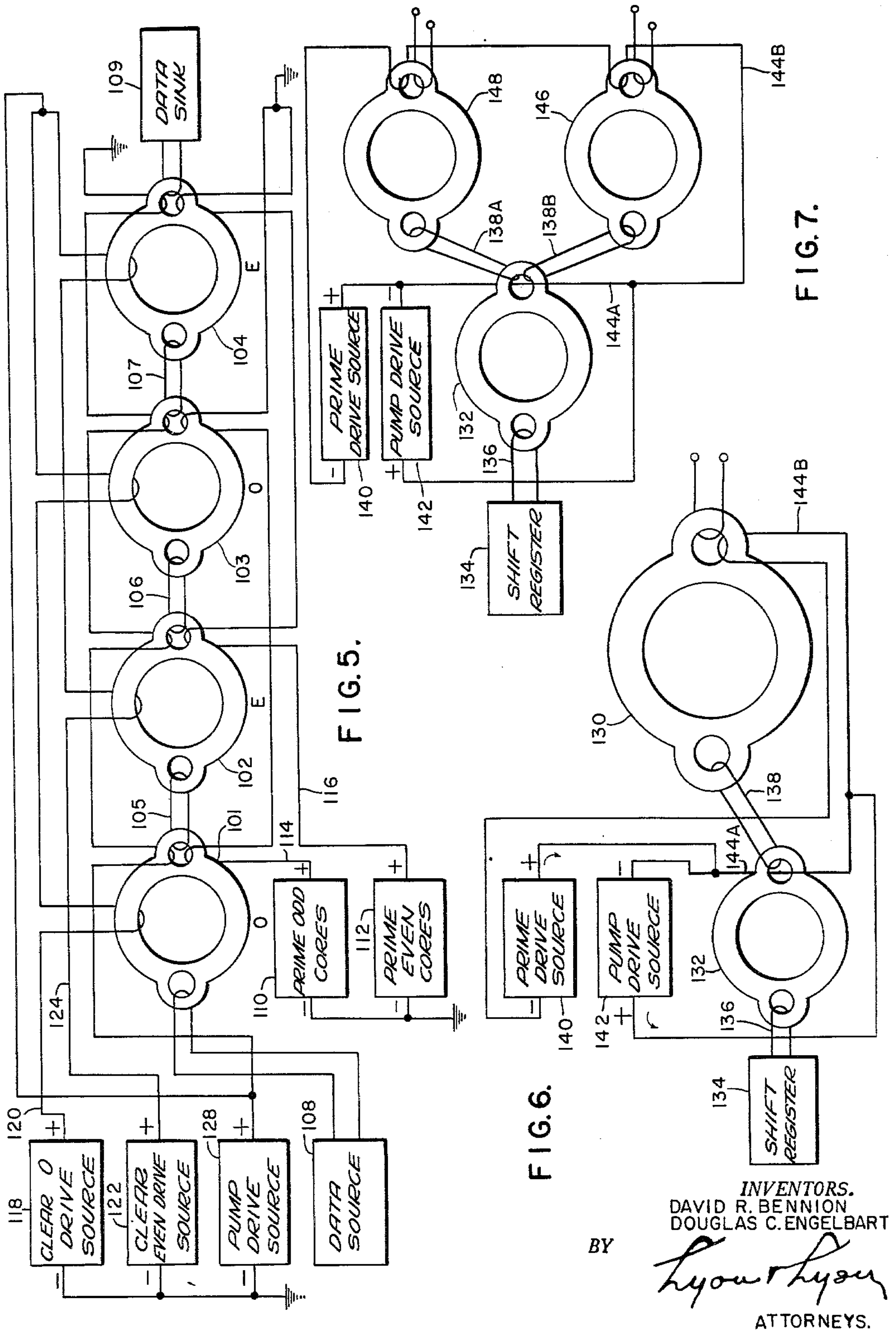
FIGURE 5 is a circuit diagram of an embodiment of the invention showing an arrangement for multiple priming and pumping of a register.
FIGURE 6 is a circuit diagram of an embodiment of the invention for transferring data from a smaller to a larger core.
FIGURE 7 is a circuit diagram of an embodiment of the invention for transferring data from one to a plurality of cores.

An illustrative arrangement for doing this is shown in FIGURE 4 of the drawings, which is identical with FIGURE 7 of the aforementioned application by David R. Bennion, except for the additions made in accordance with this invention of a pump drive source connected to the prime drive winding. Thus, the shift register is exemplified by four cores 61, 62, 63, 64 each having a major aperture, respectively 61M, 62M, 63M, 64M (now used as the input aperture), and an output aperture, respectively 61T, 62T, 63T, 64T. A clear-odd pulse source 70 applies current to a clear-odd core winding 72. This winding is inductively coupled to the odd cores in the register, passing through their major apertures. A clear-even pulse source 74 provides current pulses to a clear-even core winding 76. This winding is inductively coupled to all the even cores in the shift register through their major apertures. A transfer winding, respectively 81, 82, 83, is provided for coupling succeeding cores; the transfer winding being inductively coupled to a preceding core through its output aperture and to the succeeding core through its input aperture. The input to the first core 61 is received over an input winding 84 which is connected to a data source 86 and is coupled to the core 61 through its input aperture. Output is received by a data sink 88 over an output winding 90 coupled to core 64 through its output aperture 64T.

A priming source 92 is connected to apply current to a priming winding having two sections, respectively 94A and 94B, which are serially connected. Section 94A is coupled to all the cores in the register passing through their main apertures proceeding from the first to the last core in the core sequence of the register. Section 94B is coupled to all the cores in the register passing through their output apertures and also proceeds from the first to the last core in the core sequence. One end of section 94A is connected to the priming source 92; the other end is connected to the junction of the ends of the odd and even clear windings not connected to the respective clear-odd and clear-even pulse sources. The end of section 94B from which coupling to the first core 61 of the register is made is also connected to the said other end of section 94A. The other end of section 94B is connected to ground.

A pump drive source 96 is connected to the end of prime-winding section 94A, which is immediately adjacent to the end connected to the prime-winding source. The polarity of the connections of the respective pump and priming sources to the priming winding is made such that current from the priming source flows through the priming winding in a direction in reverse to the direction of current flow from the pump drive source.

The drive sequence for the arrangement shown in FIGURE 4 is the same as the drive sequence for the arrangement shown in FIGURE 2. Current from the clear-even pulse source 74 flows through the clear drive winding 76, through the prime winding section 94B, serving as a holding winding, and then to ground. Current from the priming source flows through both sections of the prime winding. Current from the pump drive source 96 flows through the prime winding in a reverse direction to the current flow responsive to the priming source, thus reversing the flux around an output aperture of a partially set core and partially driving a succeeding core. Current from the clear-odd pulse source flows through the clear-odd core winding, the section 94B of the prime winding, and then to ground. The table of arrows underneath the circuit drawing shows the changing flux patterns in response to the successive excitation of the current sources. It will be appreciated from this that the drive sequence is the same as is obtained in FIGURE 2. The differences in flux patterns which occur when the input aperture is either the main or the minor aperture is found in the legs of material adjacent the minor aperture which may be used as the input aperture. The flux states of the inner and outer legs of material are interchanged when one or the other is used. The various flux states in the material about the output aperture remains the same for both situations.

FIGURE 5 shows a circuit arrangement of a shift register in accordance with this invention for affording multiple priming and flux pumping. This arrangement may be used where the flux transfer between cores is poor. It was previously stated herein that when a multiple flux-pumping operation was desired, it was necessary to separate the priming windings and the flux-pump windings. Therefore, there is provided a separate odd-core prime-drive source 110 and an even-core prime-drive source 112, which respectively can drive a first prime winding 114 and a second prime winding 116. The first prime winding 114 is connected to the odd-core prime-drive source 110, then is successively coupled through their output apertures to the odd cores 101, 103 in the core sequence of the shift register, and is then connected to ground. The second prime winding 116 is connected to the even-core prime-drive source, then is successively coupled to the even-core prime-drive source 112, then is successively coupled through their output apertures to the odd cores 102, 104 in the core sequence of the shift register, and is then connected to ground.

A clear-odd-core drive source 118 provides current for driving a clear-odd-core winding 120. This winding is inductively coupled sequentially to the odd cores 101, 103 in the shift register sequence through their main apertures. A clear-even-core drive source 122 provides current for driving a clear-even-core winding 124. This winding is inductively coupled sequentially to all the even cores 102, 104 in the shift-register sequence through their main apertures. After passing through all the cores, the clear-even-core winding and clear-odd-core winding have their far ends connected together and then connected to the end of a pump-drive winding 126, which is also connected to a pump-drive source 128. The pump-drive winding is thereafter coupled successively to all the cores in the shift-register sequence through their output apertures, and then is connected to ground. It should be noted that the coupling sense of the respective pump and prime windings is such that the magnetomotive force applied to the cores responsive to current flow through one is in reverse to the magnetomotive force applied to the cores responsive to current flow through the other.

The usual transfer windings 105, 106, 107 respectively couple the output aperture of a core to the input aperture of a succeeding core. A data source 108 provides data for the register, and a data sink 109 receives data which is transferred or shifted through the register.

In a typical operating cycle for the shift register, the respective current-drive sources are enabled to apply current to their associated windings in the following sequence:

Clear-even-core drive source (and insert data)
Prime-odd-cores drive source
Pump drive source
Prime-odd-cores drive source
(Repeat pump drive source and then prime-odd-cores drive source as often as required for overcoming losses and obtaining the desired flux gain.)
Prime-odd-cores drive source
Clear-odd-core drive source
Prime-even-cores drive source
Pump drive source
Prime-even cores drive source
(Repeat pump drive source and then prime-even-cores drive source as often as required for overcoming losses and obtaining the desired flux gain.)
Prime-even-cores drive source
Clear-even-cores drive source The flux state changes which occur are similar to those previously described (for example, for FIGURE 2) except, presumably, there is lower gain, and hence a smaller amount of flux is transferred on each pump and clear phase, so that it takes more than one pump operation to get over-all unity gain. The pump and prime windings may link both major and minor apertures in order to obtain additional range, as taught in connection with FIGURE 2 and in the previously mentioned application, Serial No. 855,335. Further, the pump and prime windings shown may be duplicated for the input apertures of the cores, and, by using a switch to connect the drive sources to one or the other set of pump and prime windings, as shown in FIGURE 3, the information in the shift register may be shifted in either direction, as desired.

FIGURE 6 shows a circuit wherein the inventive concept is employed for driving a core with larger flux capacity (core 130) from the last core 132 in the register. This arrangement may be employed where the register cores are deliberately made small to enable the use of small drive power. Core 132 has coupled thereto all the windings of the shift register, of which it is a part; however, in the interests of clarity, the remainder of this shift register is represented as a rectangle 134, and only a transfer winding 136 is shown coupling core 132 through its input aperture to the register.

If core 132 were driven to its clear state after having been driven to its set state by a preceding core in the shift register, the amount of flux which would be transferred out to the succeeding core 130 by current induced in transfer winding 138, coupling core 132 through its output aperture to core 130 through its input aperture, is insufficient to drive core 130 to its set state. A prime-drive source 140 and a pump drive source 142 are respectively connected to excite a winding having two sections 144A, 144B. These sections are connected in series with one another. The first section 144A is inductively coupled to the outer leg of the output aperture of core 132, and the second section 144B is inductively coupled to the outer leg of the output aperture of core 130.

The auxiliary pump drive source is connected to excite only section 144A of the winding, and the auxiliary prime-drive source is connected to excite both winding sections 144A, 144B. The direction of current flow through section 144A, caused by the pump drive source, is opposite to the direction of current flow caused by the prime-drive source.

In operation of the arrangement shown in FIGURE 6, after the shift register portion 134 has entered a data bit into core 132, further shift register operation is halted while a transfer of data from core 132 to core 130 takes place. This is effectuated by alternately enabling the prime-drive source 140, then the pump drive source 142, as many times as are required to transfer the state of core 132 to core 130 over the transfer winding 138. Obviously, if core 132 is in its clear state, no operation of these auxiliary pump and prime-drive sources are actually required, since there is no flux transferred between cores. However, if core 132 is in its set state, each pump drive operation after a prime-drive operation transfers some flux to core 130. The number of operations required are determined by the efficiency of the transfer and the relative sizes of the cores involved. Core 132, at the termination of the preceding operation, may be driven to its clear state, as is customary in shift-register operation, and then may receive another bit from the shift register 134. During the clear operation, core 130 receives some further flux over the transfer winding 138. A transfer of data out of core 130 may be provided for in any manner well known in this art.

FIGURE 7 shows an arrangement for transferring the state of core 132 to two or more cores 146, 148. The cores 146, 148 may be the same size as core 132, smaller or larger, as desired. Their size only determines the number of alternate pumping and priming operations required. The operation of the arrangement shown in FIGURE 7 is the same as that shown and described in FIGURE 6, and similar reference numerals are given to similar-functioning apparatus. If desired, a separate pump winding and separate prime windings may be provided for the cores, thus eliminating the common pump-prime section 144A, without, however, departing from the inventive concept shown herein. The fan-out may also be extended from cores 146, 148 to other cores, using the same pump-prime arrangement shown here.

It will be appreciated that core 132 need not be driven from a shift register, but from any data source capable of applying the required driving currents to the core. Furthermore, the shift register employed to drive core 132 need not necessarily be any of the types described herein. Readout from cores 146, 148 may be performed using any of the well-known arrangements of this art. Any known arrangement, such as a counter or a multiple clock-pulse source, may be employed for properly sequencing the multiple current-drive sources shown in each of the drawings in the manner described therefor. Such arrangements are old and well known in this art.

There has accordingly been shown and described above an arrangement whereby with the employment of a single additional drive source an improved magnetic-core shift register is obtained which affords a simplification and reduction in cost of coupling loops, and yet affords compensation for coupling losses between cores. Besides, by the use of a single additional priming winding and a toggle switch, the shift register may be made bidirectional in operation.

We claim:

1. In a shift register of the type employing a plurality of toroidal magnetic cores each having a clear and set state of magnetic remanence, said cores being inductively coupled to each other for transferring flux therebetween, each core having an input and an output aperture, a priming winding inductively coupled to all of said output apertures, and a source of priming current which when applied to said priming winding causes reversal of the flux in the magnetic material about the output aperture of a core which is in its set state, the improvement in said shift register comprising a source of pumping current, and means for applying current from said source of pumping current to said primary winding with a polarity to provide a magnetomotive drive to the magnetic material about said output apertures for driving said magnetic material back to the magnetic states from which they are driven by priming current to effectuate a transfer of flux to a succeeding core.

2. In a shift register of the type employing a plurality of toroidal magnetic cores each having a clear and set state of magnetic remanence, said cores being inductively coupled to each other for transferring flux therebetween, each core having an input and an output aperture, a priming winding inductively coupled to all of said output apertures, and a source of priming current which when applied to said priming winding reverses the flux in the magnetic material about the output aperture of a core which is in its set state, the improvement in said shift register comprising a source of pump current, and means for applying current from said source of pump current to said priming winding after the application of priming current to flow therethrough in a direction in reverse to the direction of flow of said priming current.

3. In a shift register of the type employing a plurality of magnetic toroidal cores each having a clear and a set state of magnetic remanence, each core having a first aperture and a second aperture, a plurality of flux transfer windings for coupling said plurality of cores, each winding passing through the first aperture of one core and then through the second aperture of a succeeding core, and driving winding means for transferring the state of magnetic remanence of a core in said shift register to a succeeding core, the improvement comprising a first priming winding inductively coupled to all the cores of said shift register through their output apertures, a second priming winding inductively coupled to all the cores of said shift register by their input apertures, switch means for making a connection to either said first or second priming winding, means for applying priming current to said switch means to excite the one of said two priming windings to which said switch means is connected for reversing in a core in its set state the state of flux in the core material surrounding an aperture through which said excited priming winding passes, means for applying current having a flow in reverse to said switch means to excite the one of said two priming windings to which said switch means is connected for reversing the state of flux in the core material surrounding an aperture in a core which has been primed, and means for actuating said switch to select said first priming winding for enabling data transfer through said shift register in one direction and to select said second priming winding for enabling data transfer in the opposite direction.

4. An improved shift register employing a plurality of toroidal magnetic cores each having a clear and set state of magnetic remanence whereby they represent binary data, each core having an input aperture and an output aperture, a different flux transfer winding for coupling each one of said cores through its output aperture to a succeeding one of said cores through its input aperture, first winding means for driving alternate ones of said plurality of cores to their clear states of magnetic remanence, second winding means for driving remaining ones of said plurality of cores to their set states, priming winding means inductively coupled to said plurality of cores through their output apertures, means for entering data into said shift register, means for applying priming current to said priming winding to flow in one direction for reversing the direction of magnetic flux saturation in the core material about the output apertures of those of said magnetic cores in their set states of magnetic remanence, means for applying pumping current to said priming winding to flow in a direction opposite to said one direction to reverse the effects of said priming current in those cores which are in their set states, and means for again applying the priming current to said priming winding for restoring the effects of said priming current in those of the magnetic cores in their said state.

5. A reversible shift register comprising a plurality of toroidal cores each having a clear and a set state of magnetic remanence whereby they represent binary data, each core having an input aperture and an output aperture, a different flux transfer winding for coupling each one of said cores through its output aperture to a succeeding one of said cores through its input aperture, first winding means for driving alternate ones of said plurality of cores to their clear states, second winding means for driving remaining ones of said plurality of cores to their set states, first priming winding means inductively coupled to said plurality of cores through their output apertures, second priming winding means inductively coupled to said plurality of cores through their input apertures, switch means for selecting one of said first and second priming winding means, means for applying priming current to said switch means to excite the one of said two priming windings to which said switch means is connected for reversing in a core in its set state the state of flux in the core material surrounding an aperture through which said excited priming winding passes, means for applying current having a flow in reverse to said priming current flow to said switch means to excite the one of said two priming windings to which said switch means is connected for reversing the state of flux in the core material surrounding an aperture in a core which has been primed, and means for actuating said switch to select said first priming winding to enable data transfer through said shift register in one direction and to select said second priming winding to enable data transfer in the opposite direction.

6. A data-transfer circuit comprising a plurality of toroidal magnetic cores each having a clear and set state of magentic remanence, each core having an input and an output aperture, a flux transfer winding coupling one of said cores to another of said cores for flux transfer therebetween, means for driving one of said plurality of cores to its clear state of magnetic remanence, another winding inductively coupled to each of said magnetic cores through their output apertures, means for applying priming current to said another winding to reverse the direction of flux in the magnetic material about the output apertures of said cores which are in their set states, and means for applying a pumping current to at least that portion of said another winding which is coupled to said one of said cores for applying a reverse magnetomotive drive to the magnetic material about the output aperture of said one core for driving said magnetic material back to the magnetic state from which it is driven by said priming current to effectuate a transfer of flux to said remaining core.

7. A data-transfer circuit as recited in claim 6 wherein said another core can contain more magnetic flux than said one core and there is included means for alternately and successively applying said priming and pumping currents.

8. A data-transfer circuit as recited in claim 6 wherein there is a plurality of flux transfer windings, each of said flux transfer windings being coupled between the output aperture of said one of said cores and the input aperture of a different one of the remaining ones of said plurality of cores.

References Cited by the Examiner

UNITED STATES PATENTS 2,968,795 1/61 Briggs ---------------- 340—174

IRVING L. SRAGOW, *Primary Examiner.*